UNITED STATES PATENT OFFICE.

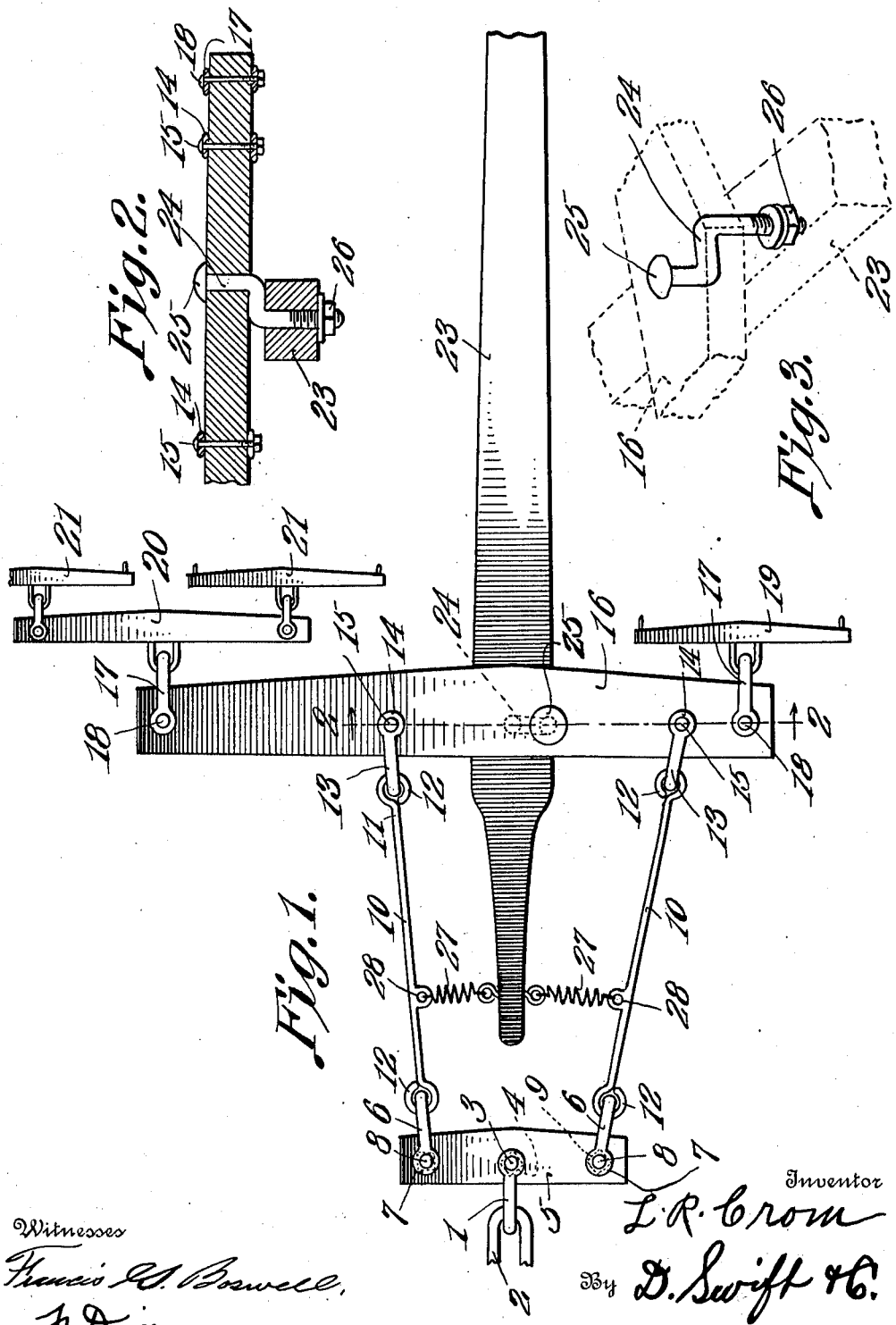

LENNIE RAY CROM, OF BLADEN, NEBRASKA.

DRAFT-EQUALIZER.

1,026,909.  Specification of Letters Patent.  Patented May 21, 1912.

Application filed November 23, 1910. Serial No. 593,888.

*To all whom it may concern:*

Be it known that I, LENNIE R. CROM, a citizen of the United States, residing at Bladen, in the county of Webster and State of Nebraska, have invented a new and useful Draft-Equalizer; and I do hereby declare the following to be a full, clear, and exact description of the invention, such as will enable others skilled in the art to which it appertains to make and use the same.

This invention pertains to a new and useful evener or equalizer adapted mainly for plows and the like, whereby the draft upon the horse or horses may be equally distributed. This equalizer may also be applied to a vehicle.

The invention in its broadest aspect aims as its primary object to provide an equalizer, embodying a tongue or beam having its rear portion yieldably connected with members, which extend between and are pivotally connected with the main equalizer beam and a supplemental equalizer beam, which may be connected to the plow.

A further object of the invention is to provide novel connections between the main equalizer beam and the supplemental beam; and further to provide an equalizer, in which there is involved novel features of construction.

Other features and combinations of parts will be hereinafter more fully set forth, shown in the drawings and claimed.

In the drawings:—Figure 1 is a plan view of an equalizer showing the features of the invention. Fig. 2 is a sectional view on line 2—2 of Fig. 1, showing the cranking device between the tongue or beam and the main equalizer beam. Fig. 3 is a detail view in perspective of the connections between the supplemental equalizer beam and the main equalizer beam.

Referring to the drawings, in which the preferred form of the invention is disclosed, 1 designates a clevis member, which may be connected by any suitable means, preferably by a link 2, to a vehicle, (not shown). This clevis member is secured to a supplemental equalizer beam by means of an eye bolt 3, having a threaded nut 4 upon its lower end. This eye bolt passes through the eyes of the clevis member, and through the supplemental equalizer beam 5. Each end of the supplemental equalizer beam has connected to it clevis members 6, each of which is formed with eyes 7. Penetrating the eyes 7 and the ends of the supplemental equalizer beam are the eye bolts 8, upon the threaded ends of which nuts 9 are applied.

Connected to the clevis members 6 are the link rods 10, the ends 11 of which are formed with eyes 12, which are engaged by the clevis members 13. The clevis members 13 are formed with eyes 14, through which and the main equalizer beam the eye bolts 15 extend, there being suitable nuts applied to the said eye bolts 15 in order to secure them in position. The main equalizer beam 16, at each end thereof, is provided with clevis members 17, similar to the clevis members of the supplemental equalizing beam. The clevis members 17 are also formed with eyes, through which eye bolts 18 extend. These eye bolts 18 extend through the main equalizer beam, as shown in the drawings. A swingletree 19 is connected to one of the clevis members at one end of the main equalizer beam, while to the clevis member at the opposite end thereof a doubletree 20 is connected, to which independent swingletrees 21 are connected.

The main equalizer beam extends transversely of the tongue or pole 23, and is connected to the tongue or pole by means of a cranking device 24. The upper end of this cranking device is provided with a head 25, while the lower end is supplied with a nut 26. By this cranking device, the main equalizer beam has a varied pivotal action, as the horses pull upon the various members of the equalizer.

The rear end of the pole or tongue has connected to it springs 27, the outer ends of which are secured to the link rods 10, as shown at 28, so that when the pole or tongue has a pivotal action, the yieldable members tend to maintain the equilibrium or position of the pole or tongue. The pole or tongue is carried principally by the equalizer 16, but is steadied and supported properly in position by the aid of the springs 27.

From the foregoing, when taken in connection with the annexed drawing, it will be observed that a novel and efficient equalizer is devised, and one which may be produced at but a slight cost.

The invention having been set forth, what is claimed as new and useful is:—

In a draft equalizer, a forward main equalizer beam, a rear supplemental equalizer beam, link connections between the beams, a tongue having its rear portion arranged between the link connections, a cranking connection between the tongue and the forward equalizer beam, and springs on each side of the rear end of the tongue and connecting between the rear end and the links of each of the link connections.

In testimony whereof I have signed my name to this specification in the presence of two subscribing witnesses.

LENNIE RAY CROM.

Witnesses:
U. S. MACKLIN,
C. J. CROM.

Copies of this patent may be obtained for five cents each, by addressing the "Commissioner of Patents, Washington, D. C."